(12) United States Patent
Williams

(10) Patent No.: US 7,851,962 B1
(45) Date of Patent: Dec. 14, 2010

(54) INDUCTION MOTOR UTILIZING DUAL STATORS AND A DOUBLE SQUIRREL CAGE MOTOR

(76) Inventor: Kevin R. Williams, P.O. Box 1359, Cypress, TX (US) 77410-1359

( * ) Notice: Subject to any disclaimer, the term of this patent is extended or adjusted under 35 U.S.C. 154(b) by 189 days.

(21) Appl. No.: 12/135,964

(22) Filed: Jun. 9, 2008

Related U.S. Application Data

(60) Provisional application No. 60/944,030, filed on Jun. 14, 2007.

(51) Int. Cl.
    *H02K 16/00* (2006.01)
(52) U.S. Cl. ........................ 310/212; 310/113
(58) Field of Classification Search ............ 310/211, 310/212, 112–114, 266
    See application file for complete search history.

(56) References Cited

U.S. PATENT DOCUMENTS

| | | | | |
|---|---|---|---|---|
| 2,064,583 A | * | 12/1936 | Wolkoff | 310/40 R |
| 3,724,683 A | * | 4/1973 | Boyd | 414/22.68 |
| 3,931,535 A | * | 1/1976 | Roesel, Jr. | 310/113 |
| 5,783,893 A | * | 7/1998 | Dade et al. | 310/266 |

\* cited by examiner

*Primary Examiner*—Dang D Le
(74) *Attorney, Agent, or Firm*—Egbert Law Offices PLLC

(57) ABSTRACT

A motor apparatus has a housing, an outer stator positioned within the housing, an inner stator positioned within the housing and interior of the outer stator, a rotor positioned in the housing between the outer stator and the inner stator, a first squirrel cage affixed to an outer diameter of the rotor in spaced relationship to the outer stator, a second squirrel cage affixed to an inner diameter of the rotor in spaced relationship to the inner stator, and a shaft connected to the rotor such that the shaft rotates relative to a rotation of the inner rotor. The shaft extends outwardly of the housing. A power source is electrically connected to the outer stator and to the inner stator.

20 Claims, 3 Drawing Sheets

INDUCTION MOTOR UTILIZING DUAL STATORS AND A DOUBLE SQUIRREL CAGE MOTOR

CROSS-REFERENCE TO RELATED U.S. APPLICATIONS

The present application claims priority from U.S. Provisional Patent Application No. 60/944,030, filed on Jun. 14, 2007, and entitled "Induction Motor Utilizing Dual Stators and a Double Squirrel Cage Rotor".

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to three-phase AC induction motors. More particularly, the present invention relates to three-phase AC induction motors which utilize squirrel cage rotors. More particularly, the present invention relates to squirrel cage motors which utilize dual stators. The present invention also relates to drilling apparatus that have motors for driving a winch drum associated with paying in and out a drilling string.

2. Description of Related Art Including Information Disclosed Under 37 CFR 1.97 and 37 CFR 1.98

The use of electrical motors is well known. The most commonly used electrical motor is the three-phase AC induction motor. In induction motors, the rotor assembly comprises a generally cylindrically-shaped unit wherein the sides of the unit are formed by a series of spaced electrically conductive metal bars, extending from one end of the rotor to the other. An associated stator assembly is disposed around the rotor and includes electrical windings. When electrical current is applied to the stator windings, the electrical field provided creates eddy currents in the metal bars, causing the bars to move, and thereby, the rotor to rotate within the stator. Because of the cage-like configuration of the rotor, it is commonly referred to as a squirrel cage rotor, and motors in which such rotors are present are referred to as "squirrel cage" induction motors.

While there are other types of rotors, most AC motors use the squirrel cage rotor. These rotors are found in almost all domestic and light industrial AC motors. For example, CD and DVD players may use very small squirrel cage motors, producing about twenty-five watts of power, and appliances such as washing machines may use squirrel cage motors producing about 250 watts of power. These motors are capable of producing much more power, as motors for use by pipeline compressors may produce tens of thousands of kW of output.

Large AC motors are often used on offshore oil rigs, serving to power the drawworks or other systems. The drawworks is a machine that is used to raise and lower a line connected to a drill string. Conventional drawworks were once DC motor-driven systems with transmissions typically geared through the use of chain and sprocket drive systems. These drawworks used pneumatic clutches and frictions to mechanically tie the selected gearing to the drive shaft eventually coupling the DC machines to the drawworks via a speed and torque ratio. Using this configuration, the DC motors were uncoupled during the lowering functions and a system of brakes were used to lower the drill string.

More recently, oil rigs have used gear-driven drawworks with fixed ratios using standard AC induction motors. When using fixed gearbox ratios, the amount of torque required in lifting heavy loads dictates a ratio that minimizes the braking torque during lowering. In AC motor applications, once the nominal speed of the machine is greater than its design rating, the torque produced for a given ampere is inversely proportional to the increase of speed over the nominal rated speed. Once again, this dictates the need for braking means above and beyond the braking torque capacity of the electric motor.

Another issue encountered when using gear driven drawworks is the inertia of the rotors when driven by electric motors. It has been found that a large part of the braking power required in slowing down or speeding up the drawworks is dictated by the system inertia. Drawworks must often compensate for the heave encountered when working on floating rigs. This makes the effect of the inertia very important and a high inertia leads to greater fuel consumption, greater power requirements, and increased emissions.

In applications other than offshore drilling, some drawworks utilize permanent magnet technology. Problems in the cost of rare earth magnets, temperature considerations and magnetic saturation makes this an expensive option and not as reliable as induction technology.

The present invention may be used as part of a "top drive" direct drive system associated with a drilling rig. In a top drive system, a motor or series of motors is suspended from a derrick. The motor's shaft is coupled to a short section of pipe or pipe-handling apparatus that is connected to the drill string. The action of the motor directly rotates the drill string without the use of a gearbox. Since the motor and pipe handling apparatus are suspended well above the rig floor, the system can handle multiple lengths of pipe at once. As the well is drilled, the motor and pipe-handling apparatus are lowered and then raised again when there is a need to affix more pipe to the drill string. The motor of the present invention is suitable for use in a top drive system particularly because of its lower torque to weight ratio and its smaller size.

Many patents have issued that are relevant to the current invention. For example, U.S. Pat. No. 5,783,893, issued on Jul. 21, 1998, teaches an electric machine, such as a motor or generator, configured in a machine housing with a cup-shaped rotor attached to a shaft rotatively supported in the housing, an inner stator coaxial with and enclosed by the rotor, and an outer stator coaxial with and enclosing the rotor. The inner and outer portions of the machine are separated by a magnetic isolator that divides and supports inner and outer portions of the rotor. The magnetic isolator, which supports inner and outer sets of permanent magnets in one embodiment and inner and outer squirrel cage rotor assemblies in another embodiment is preferably made of non-magnetic stainless steel but may also be made of titanium, brass, aluminum, bronze or magnesium, or any material that provides magnetic isolation between the inner and outer portions of the machine.

U.S. Pat. No. 5,525,851, issued on Jun. 11, 1996 to Kumamoto et al., describes an apparatus for producing high-speed rotation which has a rotary shaft integrally having a first rotor with magnetic anisotropy, and a rotary sleeve disposed around the rotary shaft. The rotary sleeve has a first stator surrounding the first rotor and integrally has a second rotor having magnetic anisotropy. The first stator has a field winding for magnetizing the first rotor in a predetermined direction. This winding is also an armature winding because it undergoes high-speed rotation with the second rotor. The rotary sleeve is received in a housing which has a second stator surrounding the second rotor. The second stator has a field winding for magnetizing the second rotor in a predetermined direction and for producing high-speed rotation of the second rotor. By analogy, the housing can become a further rotary sleeve, constructed similarly to the above-mentioned rotary sleeve.

U.S. Pat. No. 6,819,026, issued on Nov. 16, 2004 to Narita et al., teaches a radial-air-gap induction motor constituted so as to have two air gaps by setting a rotor between a cylindrical outer stator and inner stator in order to improve an efficiency by increasing the ratio of torque/(square of current) by a two air gaps, apply windings for generating a rotating magnetic field to the outer and inner stators, and form squirrel-cage windings on the rotor. This patent claims priority of U.S. Patent Publication No. 2003/0201686, published on Oct. 30, 2003.

U.S. Patent Publication No. 2003/0155832, published on Aug. 21, 2003 by Herren, teaches an electric motor additive speed drive assembly which comprises at least two incrementally increasing diameter electric motors mounted in an integrated concentric manner along a common axis such that the speed and horsepower of the assembly output shaft is the sum of the speed and horsepower of the energized electric motors in the assembly. At least one set of electrically conductive end bearings spans the annular space between the casings of each motor in the assembly allowing the stators of each internal motor to rotate. Electricity is conducted to each inner motor through the electrically conductive end bearings.

U.S. Pat. No. 6,031,312, issued on Feb. 29, 2000 to Zoche et al., describes a squirrel cage rotor that includes a cage, lamination sheets provided with a plurality of slots, and short circuit rings arranged at the axial ends of the lamination sheets and connected by short circuit rods disposed within the slots. In one aspect, the lamination sheets comprise sheets made of an amorphous magnetic material, especially of an amorphous metal with high saturation magnetization. In another aspect, the slots are formed with a convex base portion. In a further aspect, the short circuit rings are made of a metal matrix composite material with high electrical conductivity, preferably of a fiber-reinforced aluminum matrix composite material.

U.S. Pat. No. 4,064,410, issued on Dec. 20, 1977 to Roach, teaches a rotor for use in a dynamo-electric machine comprising a shaft, a laminated magnetic core carried by the shaft, a plurality of arcuately spaced-apart rotor bars carried by the core and having end portions protruding beyond the end laminations at opposite ends of the core, and a pair of end rings disposed at opposite ends of the core and joined to the protruding end portions of the rotor bars. The axially facing inner end surface of each end ring has a series of arcuately-spaced radially-extending channels formed therein with intervening arcuately-spaced radially-extending ribs defined therebetween, with the channels receiving the protruding end portions of the rotor bars therein, and with the ribs bearing tightly against the end laminations at opposite ends of the laminated core to maintain the laminated core in tightly compressed condition.

U.S. Pat. No. 5,444,319, issued on Aug. 22, 1995 to Nakamura et al., teaches a squirrel-cage rotor which includes a laminated core fixed to a rotor shaft, a plurality of secondary conductors arranged respectively in a plurality of through holes formed through the laminated core, a pair of end rings connected to the secondary conductors at axial ends of the laminated core, and a pair of reinforcing members covering the end rings. The secondary conductors and the end rings are integrally formed through a casting process, and are connected with the laminated core and the reinforcing members. Each reinforcing member is formed as an annular element of high-rigidity material, and includes a cylindrical wall surrounding the cylindrical outer surface of the end ring, a multi-aperture wall provided with a plurality of apertures which communicate respectively with the through holes of the laminated core and held between the end ring and the laminated core, and an end wall brought into contact with the axial outer surface of the end ring.

U.S. Pat. No. 7,030,528, issued on Apr. 18, 2006 to Morgante, teaches a dual concentric AC motor which allows for two independently operating AC motors that produce the same torque at the same current input as two conventional, separate electric motors while occupying a smaller physical volume. The dual concentric AC motor utilizes a single, hollow cylindrical stator core comprising inner and outer stators and an inner rotor and an outer rotor that operate independently of one another. The inner stator, with windings that face toward the center of the motor, couples to the inner rotor, which rotates inside the single stator core, while the outer stator, with windings that face away from the center of the motor, couples to the outer rotor, which rotates around the single stator core. A back iron, centrally located in the single stator core, physically and magnetically separates the inner and outer stators. The two rotors are coupled to separate, independent output shafts.

U.S. Pat. No. 5,281,879, issued on Jan. 25, 1994 to Satake et al., teaches a synchronous motor which includes a unitary rotor, a first stator, a second stator and phase-changing switches. The unitary rotor has a first rotor portion formed by a first permanent magnet and a second rotor portion formed by a second permanent magnet and an induction type rotor. These first and second rotor portions are mounted on a common rotary axle with a predetermined space provided therebetween. The first stator faces the first rotor portion for producing a first rotating magnetic field. The second stator faces the second rotor portion for producing a second rotating magnetic field and is disposed such that, at the starting operation, the attracting action or the repelling action produced between the first rotating magnetic field and the first permanent magnet is canceled by the repelling action or the attracting action produced between the second rotating magnetic field and the permanent magnetic field. The phase-changing switches are associated with either one of the first stator or the second stator and set a phase difference of 0 degree or 180 degrees between the first rotating magnetic field and the second rotating magnetic field. Due to the cancellation action, any starting interference which may otherwise be caused by the permanent magnets is made negligible.

U.S. Pat. No. 4,829,205, issued on May 9, 1989 to Lindgren, describes an induction-motor structure having a synchronous-rotor and an induction-rotor in which inner and outer synchronous-rotor poles and a synchronous-rotor-pole connector surround the inner-cylindrical surface of the hollow cylindrical induction rotor. The outer-cylindrical surface of a hollow cylindrical stator core has alternating-current windings and surround the ends of that induction rotor and that core. At least one of the rotor poles includes magnetic field concentrators. A stationary field winding is mounted on the end of the stator and may be used to adjust the power factor.

U.S. Pat. No. 4,920,293, issued on Apr. 24, 1990 to Kanda, teaches a squirrel-cage induction motor having a sectional stator comprising a first stator fixedly held on a frame, and a second stator circumferentially movably supported on the frame beside the first stator. The second stator is displaced relative to the first stator through a gear mechanism by a control motor through an angle meeting operating conditions of the squirrel-cage motor required by the load. Thus, the squirrel-cage induction motor has satisfactory response characteristics, and the second stator can manually be turned in case the component of the mechanism for driving the second stator (for example, the control motor) malfunctions.

It is an object of the present invention to provide a squirrel cage induction motor which optimizes intermittent power density.

It is a further object of the present invention to provide a squirrel cage induction motor which optimizes peak torque capability.

It is a further object of the present invention to provide a squirrel cage induction motor which minimizes motor weight.

It is a further object of the present invention to provide a squirrel cage induction motor which increases torque-to-weight ratio.

It is a further object of the present invention to provide a squirrel cage induction motor which minimizes inertia associated with the motor.

These and other objects and advantages of the present invention will become apparent from a reading of the attached specification and appended claims.

BRIEF SUMMARY OF THE INVENTION

The present invention is a motor apparatus that comprises a housing, an outer stator positioned within the housing, an inner stator positioned within the housing and interior of the outer stator, a rotor positioned in the housing between the outer stator and the inner stator, a first squirrel cage affixed to an outer diameter of the rotor in spaced relationship to the outer stator, a second squirrel cage affixed to an inner diameter of the rotor in spaced relationship to the inner stator, and a shaft affixed to said rotor such that the shaft rotates relative to a rotation of the rotor. The shaft extends outwardly of the housing.

The outer stator has a winding extending therearound. Also, the inner stator has a winding extending therearound. The outer stator and the inner stator and the rotor are in concentric relationship within the housing. The outer stator and the first squirrel cage define a first air gap therebetween. The inner stator and the second squirrel cage define a second air gap therebetween. A power source is electrically connected to the outer stator and the inner stator.

The first squirrel cage has a plurality of bars extending therethrough. Similarly, the second squirrel cage also has a plurality of bars extending therethrough. The plurality of bars of the first squirrel cage extend in concentric relationship to the outer stator. The plurality of bars of the second squirrel cage extend in concentric relationship with the inner stator. The plurality of bars of the first and second squirrel cages are in parallel relationship to each other. The plurality of bars of the first squirrel cage extend for the length of the rotor. Also, the plurality of bars of the first squirrel cage extend for the length of the rotor. In the preferred embodiment, the plurality of bars of the first and second squirrel cages are of a copper material.

The present invention is also a drilling apparatus that comprises a derrick, a winch drum supported adjacent the derrick, a drill string supported within the derrick, a line extending around the winch drum and connected to the drill string, and a motor connected to the winch drum. The motor has a housing, an outer stator positioned within the housing, an inner stator positioned within the housing and interior of the outer stator, a rotor positioned in the housing between the outer stator and the inner stator, a first squirrel cage affixed to an outer diameter of the rotor in spaced relationship to the outer stator, a second squirrel cage affixed to an inner diameter of the rotor in spaced relationship to the inner stator, and a shaft affixed to the rotor such that the shaft rotates relative to a rotation of the rotor. The shaft extends outwardly of the housing and is interconnected to the winch drum.

A power means is electrically connected to the outer stator and to the inner stator. The power means serves to pass energy to the inner and outer stators when the winch drum rotates so as to pay in the line. The power means serves to receive energy from the inner stator and the outer stator when the winch drum rotates so as to pay out the line. The winch drum is affixed to the derrick. The winch drum is rotatable so as to pay in and to pay out the line so as to lower and raise the drill string.

The motor of the present invention may be extremely useful in offshore drilling applications such as top drives and drawworks. These applications require high power and torque, and for top drives limited available space makes motor size a significant consideration. Use of the motor of the present invention with a heave-compensation drawworks allows for the lowering of the drill string without the need for auxiliary braking systems. The motor has a relatively lower weight and inertia and has an increased torque-to-weight ratio over motors of the prior art. Additionally, the motor of the present invention optimizes intermittent power density and peak torque capability.

In an alternative embodiment of the present invention, multiple motors may be "stacked" to provide more power. In a stacked configuration, the motors may all operate on a common shaft attached to each of the rotors of the stacked motors. Such a configuration may be very useful in turning the winch drum of a heave-compensation drawworks.

DETAILED DESCRIPTION OF THE INVENTION

Figure 1:
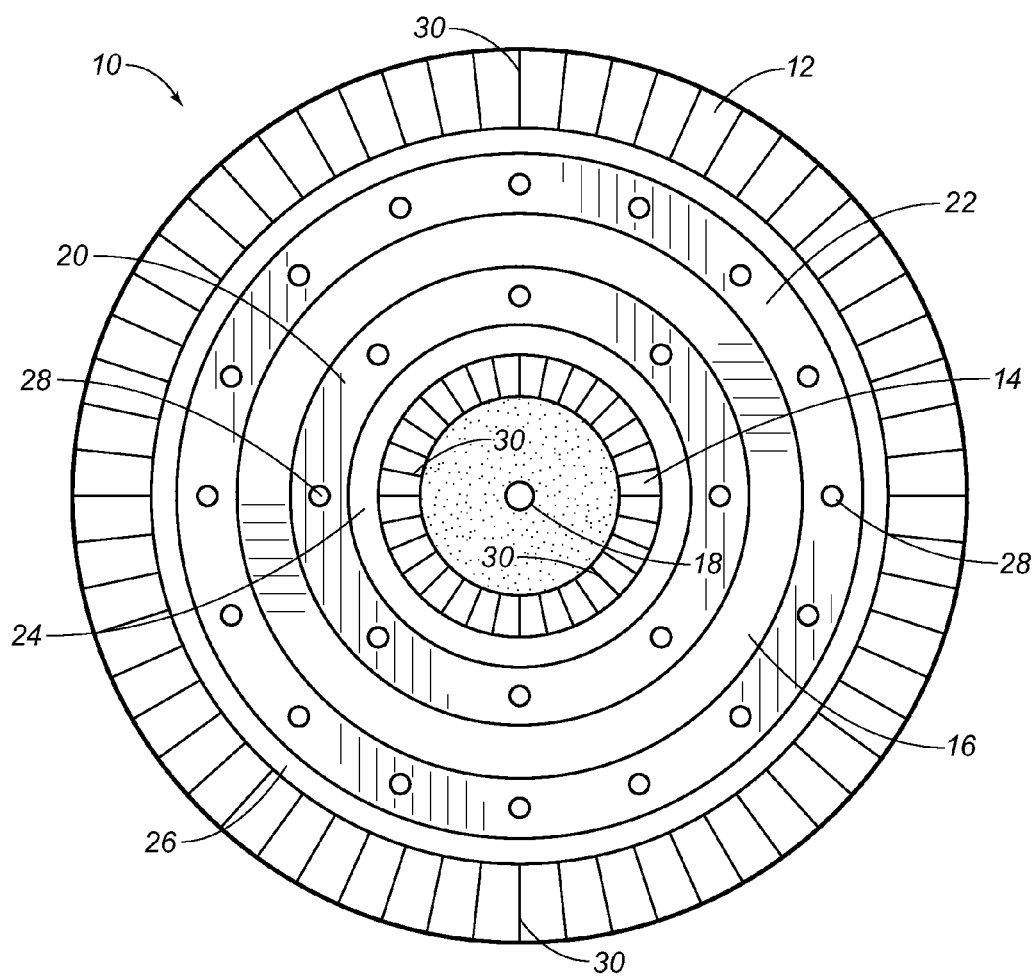
FIG. 1 is a side sectional view of the squirrel cage motor of the present invention.
Figure 2:
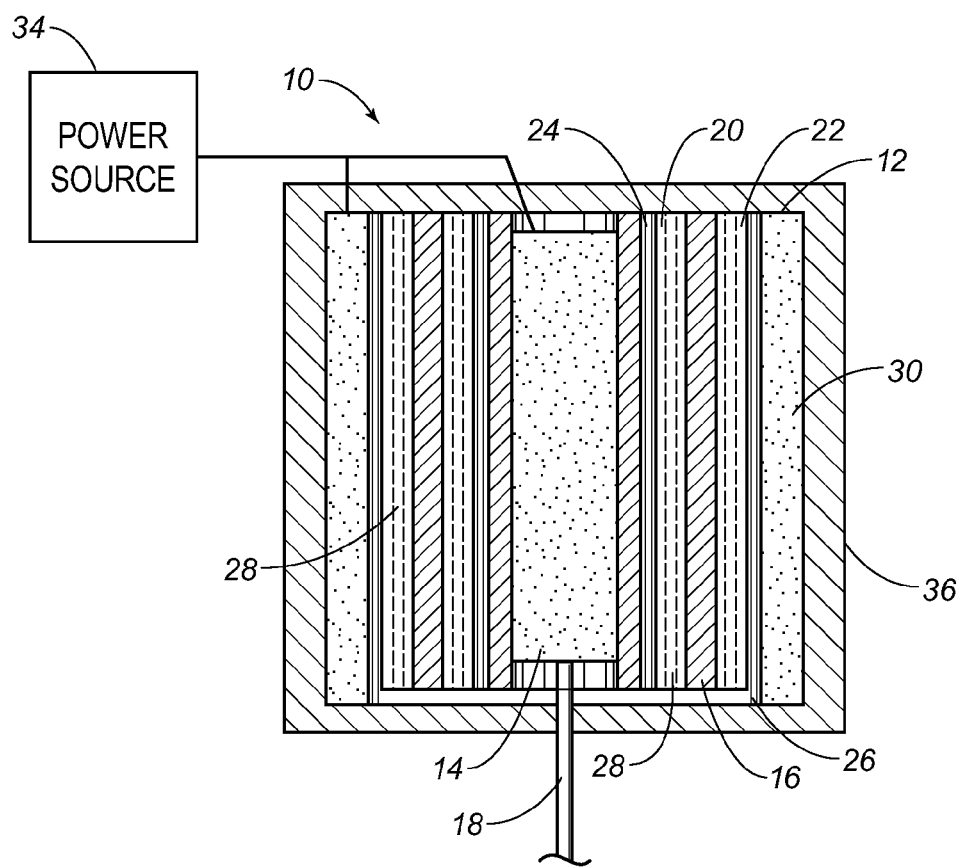
FIG. 2 is a sectional profile view of the squirrel cage motor of the present invention.

FIGS. 1 and 2 show the motor 10 of the present invention. Essentially, the motor 10 comprises an outer stator 12, an inner stator 14 and a rotor 16. The rotor 16 comprises a shaft 18, an inner squirrel cage 20 and an outer squirrel cage 22. Inner squirrel cage 20 is situated on the outer diameter of rotor 16. Outer squirrel cage 22 is situated on the outer diameter of rotor 16. The rotor 16 is generally cup-shaped and positioned so that it surrounds inner stator 14 and sits inside of outer stator 12. The rotor 16 is coaxial to stators 12 and 14. The rotor 16 is separated from the inner stator 14 and outer stators 12 by respective air gaps 24 and 26. Inner air gap 24 lies between inner squirrel cage 20 and inner stator 14. Outer air gap 26 lies between outer squirrel cage 22 and outer stator 12. The shaft 18 is connected to the rotor 16 so as to rotate relative to a rotation of the rotor 16. The shaft 18 has a portion extending outwardly of the housing 36.

The inner stator 14 and outer stator 12 are covered in a series of windings 30 and are connected to a power source 34 (shown in FIG. 2). The inner stator 14 operates upon inner squirrel cage 20, while outer stator 12 operates upon outer squirrel cage 22. The motor 10 is configured so that it may operate using either one or both of the stators 12 and 14. The squirrel cages 20 and 22 of the rotor 16 contain a plurality of bars 28 which extend concentrically to the stators 12 and 14 and run the length of the rotor 16. The bars 28 are represented in FIG. 1 as small circles, and in FIG. 2 as dashed lines. FIG. 2 show the components of the motor 10 contained within the housing 36.

In the preferred embodiment of the present invention, the bars 28 are formed of copper. The flux created by the stators 12 and 14 acts so as to rotate the squirrel cages 20 and 22. The flux generated by inner stator 14 opposes the flux generated by the outer stator 12. This design serves to reduce the amount of magnetic steel required for the motor. Reducing the amount of magnetic steel reduces the weight of the machine, increases the torque to weight ratio, and minimizes the inertia of the rotating masses. The number of poles with respect to the base frequency is optimized for the best power factor and machine efficiency without losing the required output torque and power ratings. Experiments with the present invention show that 68% of the power is from outer stator 12 and 32% of the power is from inner stator 14.

Figure 3:
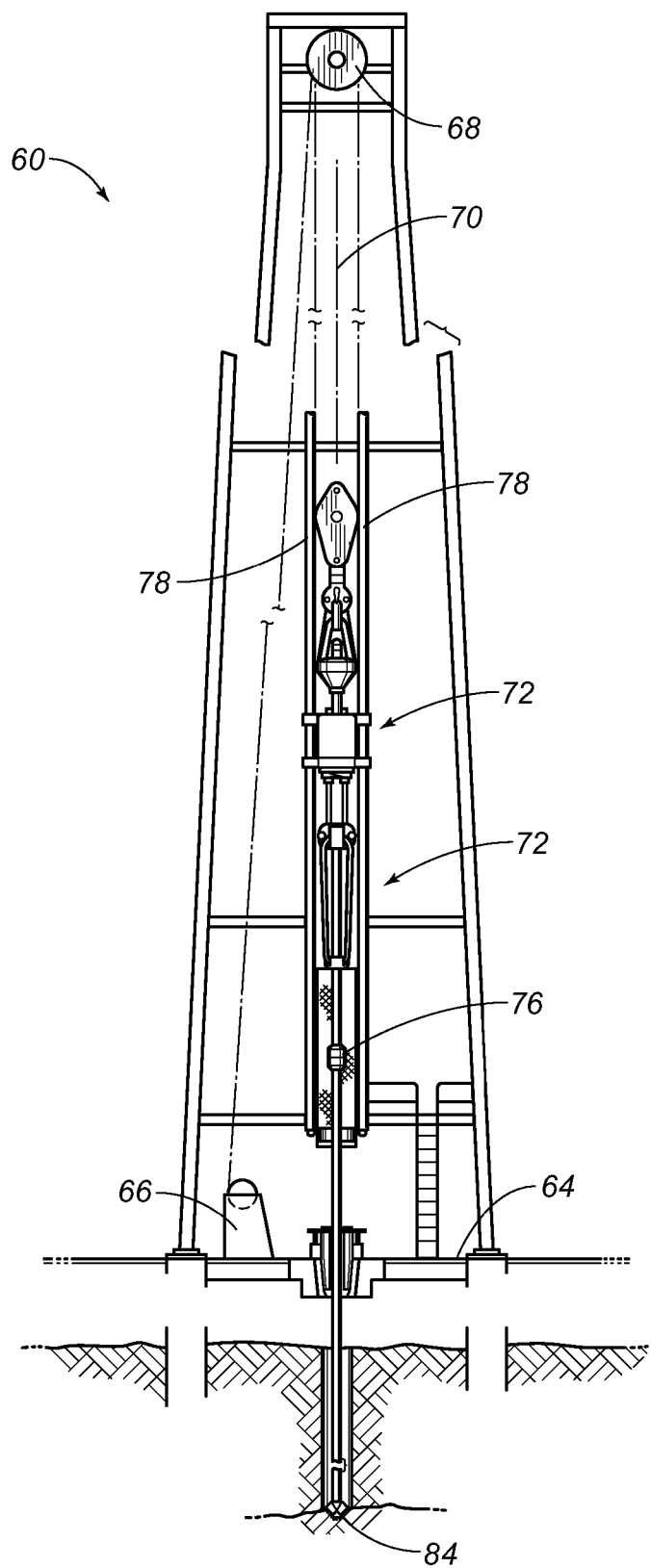
FIG. 3 shows the present invention in use with a top drive drilling system.

FIG. 3 shows the present invention in use as with a top drive drilling system 60. Derrick 62 is shown resting on drilling floor 64 of a drilling ship or oil rig. The motor 72 of the present invention is shown suspended by cable 70 above the drilling floor 64. The shaft end of motor 72 is coupled to a pipe handling apparatus 74. The pipe handling apparatus is shown attached at point 76 to drill string 80. Drill string 80 is shown extending through the drilling floor 64 and through the seabed 82. The drill bit 84 is shown at the end of drill string 80.

The motor 72 serves to auger the drill string 80 and drill bit 84 into the ground. As the drill string 80 goes deeper into the well, the winch drum 66 pays out cable 70, and the motor 72 and pipe handling apparatus 74 are lowered along guide rails 78.

The motor of the present invention may also be used to power the drawworks of a drilling rig. Referring to FIG. 3, the drawworks is the system of raising and lowering the drill string 80. The drawworks comprises the derrick 62, the winch 66, the crown block 68, and cable 70. The motor of the present invention could be coupled to and turn the winch drum 66. As the motor turns the winch drum 66, cable 70 is paid in or out. This allows the driller to maintain the drill string 80 in a constant position relative to the seabed and to maintain a constant weight-on-bit, while the drilling rig itself is moving up and down due to the motion of waves. While not shown in FIG. 3, the motor of the present invention would be positioned adjacent to winch drum 66 and turn the winch drum without the use of a gearbox.

Use of the motor of the present invention with a direct drive drawworks system allows braking to be accomplished strictly from the motor without giving up performance as is the case with conventional gear-driven drawworks utilizing conventional traction or standard industrial AC motors. Several drawworks have been used in the field without auxiliary braking systems. However, these gear-driven drawworks suffer from a lower maximum speed which the operator can achieve because of torque considerations when stopping the load. Using the motor of the present invention, the desirable speed can be reached safely without the use of clutches, band brakes, or auxiliary brakes. The dual stator, double squirrel cage motor which directly drives the drawworks drum is able to handle all of the braking needs associated with active heave functions.

The foregoing disclosure and description of the invention is illustrative and explanatory thereof. Various changes in the details of the illustrated construction can be made within the scope of the present invention without departing from the true spirit of the invention. The present invention should only be limited by the following claims and their legal equivalents.

I claim:

1. A motor apparatus comprising:
   a housing;
   an outer stator positioned within the housing, said outer stator having a smooth interior surface;
   an inner stator positioned within the housing and interior of the outer stator, said inner stator having a smooth exterior surface;
   a rotor positioned in said housing between said outer stator and said inner stator;
   a first squirrel cage affixed to an outer diameter of said rotor in spaced relationship to said outer stator, said first squirrel cage having a plurality of copper bars extending therethrough;
   a second squirrel cage affixed to an inner diameter of said rotor in spaced relationship to said inner stator, said second squirrel cage having a plurality of copper bars extending therethrough;
   a shaft connected to said rotor such that said shaft rotates relative to a rotation of said rotor, said shaft extending outwardly of said housing; and
   a power means electrically connected to said outer stator and to said inner stator, said power means for passing energy to the inner stator and for receiving energy from the inner stator, said power means for passing energy to the outer stator and for receiving energy from the outer stator.

2. The motor apparatus of claim 1, said power means for selectively passing energy to said inner stator and to said outer stator.

3. The motor apparatus of claim 2, said power means for selectively receiving energy from said inner stator and said outer stator.

4. The motor apparatus of claim 1, said outer stator having a power greater than a power of the inner stator.

5. The motor apparatus of claim 4, said power of said outer stator being 68%, said power of said inner stator being 32%.

6. The motor apparatus of claim 1, said outer stator having a winding extending therearound, said inner stator having a winding extending therearound.

7. The motor apparatus of claim 1, said outer stator and said inner stator being in concentric relationship within said housing.

8. The motor apparatus of claim 1, said outer stator and said first squirrel cage defining a first air gap therebetween, said inner stator and said second squirrel cage defining a second air gap therebetween.

9. The motor apparatus of claim 1, said first plurality of bars positioned in concentric relationship to said outer stator, said second plurality of bars positioned in concentric relationship to said inner stator, said plurality of bars of said first and second squirrel cages being in spaced parallel relationship to each other.

10. The motor apparatus of claim 9, said first plurality of bars of said first squirrel cage extending for the length of said rotor.

11. The motor apparatus of claim 1, said outer stator having a smooth inner surface, said inner stator having a smooth outer surface.

12. A drilling apparatus comprising:
a derrick;
a winch drum supported adjacent said derrick;
a drill string supported within said derrick;
a line extending around said winch drum and connected to said drill string; and
a motor connected to said winch drum, said motor comprising:
  a housing;
  an outer stator positioned within the housing, said outer stator having a smooth interior surface;
  an inner stator positioned within the housing and interior of the outer stator, said inner stator having a smooth exterior surface;
  a rotor positioned in said housing between said outer stator and said inner stator;
  a first squirrel cage affixed to an outer diameter of said rotor in spaced relationship to said outer stator, said first squirrel cage having a plurality of copper bars extending therethrough;
  a second squirrel cage affixed to an inner diameter of said rotor in spaced relationship to said inner stator, said second squirrel cage having a plurality of copper bars extending therethrough;
  a shaft connected to said rotor such that said shaft rotates relative to a rotation of said rotor, said shaft extending outwardly of said housing; and
  a power means electrically connected to said outer stator and said inner stator, said power means for passing energy to said inner stator and to said outer stator when said winch drum rotates so as to pay in said line, said power means for receiving energy from said inner stator and said outer stator when said winch drum rotates so as to pay out said line.

13. The drilling apparatus of claim 12, said winch drum affixed to said derrick, said winch drum being rotatable so as to pay in and pay out said line so as to lower and raise said drill string.

14. The drilling apparatus of claim 12, said outer stator and said inner stator and said rotor being in concentric relationship within said housing, said outer stator and said first squirrel cage defining a first air gap therebetween, said inner stator and said second squirrel cage defining a second air gap therebetween.

15. The drilling apparatus of claim 12, said plurality of bars of said first squirrel cage positioned in concentric relationship to said outer stator, said plurality of bars of said second squirrel cage positioned in concentric relationship to said inner stator, said plurality of bars of said first and second squirrel cages being in spaced parallel relationship to each other.

16. The drilling apparatus of claim 12, said shaft being rotatably positioned within an interior of said inner stator.

17. The drilling apparatus of claim 12, said power means for selectively passing energy to said inner stator and to said outer stator when said winch drum rotates so as to pay in said line.

18. The drilling apparatus of claim 17, said power means for selectively receiving energy from said inner stator and said outer stator when said winch drum rotates so as to pay out said line.

19. The drilling apparatus of claim 12, said outer stator having a power greater than a power of the inner stator.

20. The drilling apparatus of claim 19, said power of said outer stator being 68%, said power of said inner stator being 32%.

* * * * *